United States Patent [19]
Cassiday et al.

[11] Patent Number: 5,799,175
[45] Date of Patent: Aug. 25, 1998

[54] SYNCHRONIZATION SYSTEM AND METHOD FOR PLESIOCHRONOUS SIGNALING

[75] Inventors: Daniel R. Cassiday, Topsfield; David L. Satterfield, Acton, both of Mass.

[73] Assignee: Sun Microsystems, Inc., Palo Alto, Calif.

[21] Appl. No.: 674,316

[22] Filed: Jul. 1, 1996

[51] Int. Cl.$^6$ .................................. G06F 1/12; G06F 5/06
[52] U.S. Cl. ........................ 395/551; 395/872; 395/881
[58] Field of Search .............................. 395/551, 558, 395/872, 881

[56] References Cited

U.S. PATENT DOCUMENTS

| | | | |
|---|---|---|---|
| 4,463,443 | 7/1984 | Frankel et al. | 395/551 X |
| 4,691,294 | 9/1987 | Humpleman | 395/881 X |
| 4,748,588 | 5/1988 | Norman et al. | 395/551 |
| 4,873,703 | 10/1989 | Crandall et al. | 395/551 X |
| 4,881,165 | 11/1989 | Sager et al. | 395/551 |
| 5,357,613 | 10/1994 | Cantrell et al. | 395/881 |
| 5,450,572 | 9/1995 | Ruedinger et al. | 395/551 X |

*Primary Examiner*—Thomas M. Heckler
*Attorney, Agent, or Firm*—Richard A. Jordan

[57] ABSTRACT

An information transfer system transfers information, in the form of at least one digital data word, from an source operating in a first clock signal domain defined by a first clock signal, to a destination operating in a second clock signal domain defined by a second clock signal. The information transfer system includes a buffer, a buffer storage element, a buffer retrieval element and a synchronizer. The buffer storage element stores the data word in the buffer under control of a data word present indication, and the buffer retrieval element retrieves the data word from the buffer under control of the second clock signal and a synchronized data word present indication. The synchronizer generates the synchronized data word present indication in response to the first clock signal, the second clock signal, and the data word present indication, thereby to synchronize the data word present indication from the first clock signal domain into the second clock signal domain.

45 Claims, 4 Drawing Sheets

SYNCHRONIZATION SYSTEM AND METHOD FOR PLESIOCHRONOUS SIGNALING

FIELD OF THE INVENTION

The invention relates generally to the field of digital data communications, and more particularly to systems and methods for transferring digital data between a transmitter and a receiver that are controlled in response to individual clocking signals.

BACKGROUND OF THE INVENTION

In a digital communications system, a transmitter transmits digital data in the form of signals to a receiver over one or more communication links. In order to enable the receiver to identify the various bits, bytes, words, or the like, which comprises the digital data, from the transmitted signals, the receiver must be able to synchronize to the data. If the transmitter and receiver are operating in response to the same clocking or synchronization signals, synchronization to the signals is generally not a significant problem, since the only differences between the clocking signals as used by the receiver, and the timings of the data signals as received by the receiver, would be determinable a priori. However, if the transmitter and receiver operate in response to different clocking signals, even if the clocking signals are intended to be of the same frequency, the timings of the data signals may be difficult to determine a priori, and in any case would drift over time if there are even small differences in the timings of the respective clocking signals.

SUMMARY OF THE INVENTION

The invention provides a new and improved system and method for transferring digital data between a transmitter and a receiver that are controlled in response to individual clocking signals.

In brief summary, an information transfer system transfers information, in the form of at least one digital data word, from an source operating in a first clock signal domain defined by a first clock signal, to a destination operating in a second clock signal domain defined by a second clock signal. The information transfer system includes a buffer, a buffer storage element, a buffer retrieval element and a synchronizer. The buffer storage element stores the data word in the buffer under control of a data word present indication, and the buffer retrieval element retrieves the data word from the buffer under control of the second clock signal and a synchronized data word present indication. The synchronizer generates the synchronized data word present indication in response to the first clock signal, the second clock signal, and the data word present indication, thereby to synchronize the data word present indication from the first clock signal domain into the second clock signal domain.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
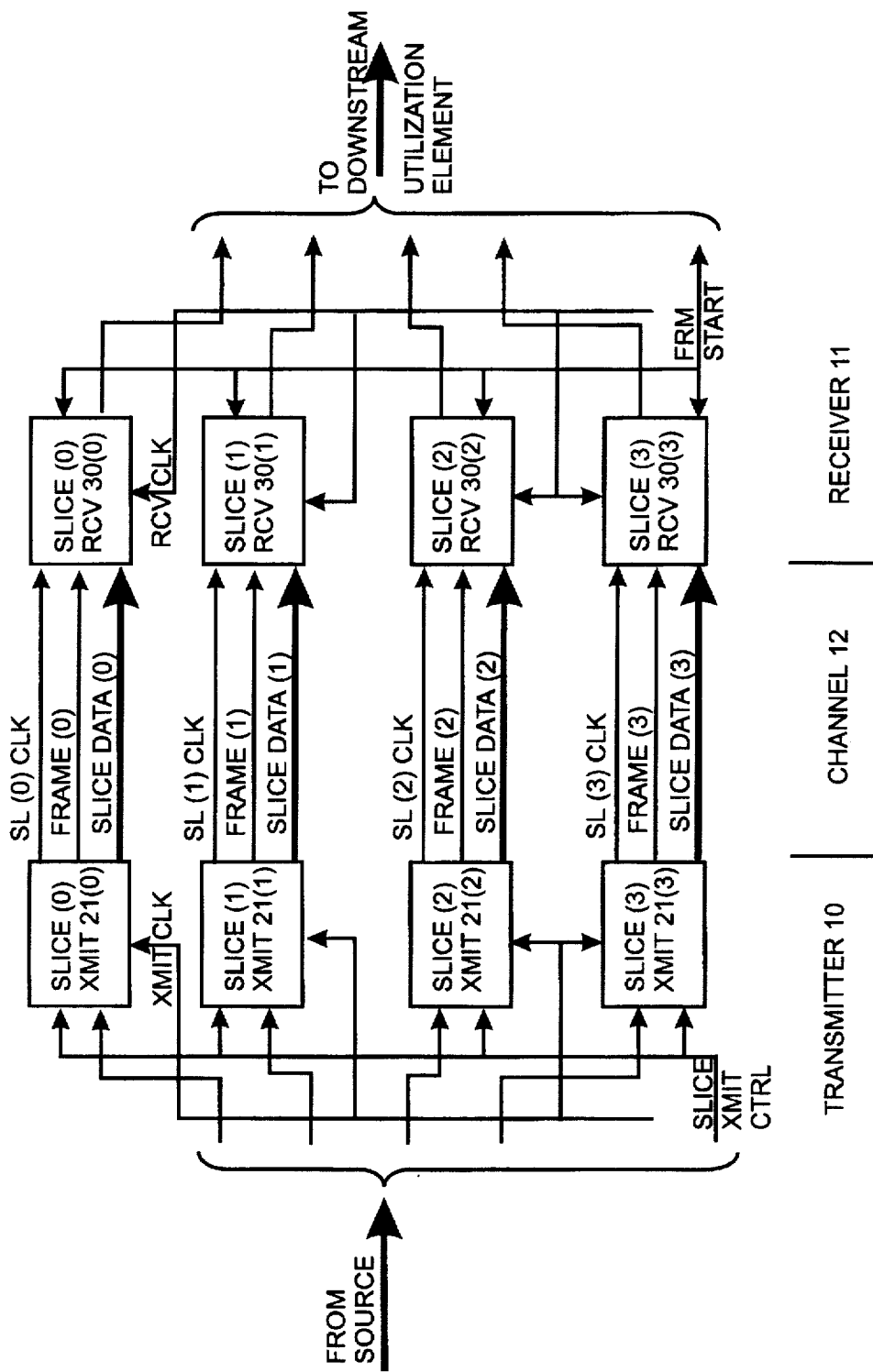
FIG. 1 is a functional block diagram of a digital communications system constructed in accordance with the invention for transferring packets from a digital information source to a destination.

FIG. 1 is a functional block diagram of a digital communications system 10 constructed in accordance with the invention for transferring information from a digital information source, such as transmitter 10, to a destination, such as receiver 11, over a channel 12. The transmitter 10 and receiver 11 may be associated with any source, in the case of transmitter 10, or user, in the case of receiver 11, of digital information, such as digital data processing systems and the like. Generally, the transmitter 10 transmits, and the receiver 11 receives, information in the form of packets, each packet including one or more successive words, with each word comprising a plurality of bits. For each packet, the bits comprising each word are transferred (that is, transmitted by the transmitter 10 and received by the receiver 11) in parallel over respective communication links comprising the channel 12, and successive words of the packet are transferred serially.

With reference to FIG. 1, the transmitter 10 includes a plurality of word slice transmit circuits 21(0) through 21(3) (generally identified by reference numeral 21(i)), which receive, from a source (not shown) successive words comprising packets to be transmitted to the receiver. Each word to be transmitted comprises a plurality of bits, and the each of the slice transmit circuits 21(i) receives selected ones of the bits from each word. In one embodiment, each word comprises forty bits, with each slice transmit circuit 21(i) receiving ten of the bits from each word. In addition, each slice transmit circuit 21(i) receives SLICE XMIT CTRL slice transmit control signals and an XMIT CLK transmit clock, which enables the slice transmit circuits 21(i) to receive the respective slices of the successive words of each packet from the source and transmit them as respective SLICE DATA(0) through SLICE DATA(3) slice data signals (generally identified as "SLICE DATA (i)" signals) over respective communication links of the channel 12. In addition, each slice transmit circuit 21(i) provides a respective SL (i) CLK slice (i) clock signal and FRAME (i) frame signal. As will be described below in connection with FIG. 2, the receiver 11 can use the SL (i) CLK slice (i) clock signals from the respective slice transmit circuits 21(i) to control the latching of the respective SLICE DATA (i) slice data signals, and the FRAME (i) frame signal to identify the beginning and end of the data slice represented by the respective SLICE DATA (i) signal for each packet.

The receiver 11 receives the respective SLICE DATA (i) slice data signals, FRAME(i) frame signals and SL (i) CLK slice clock signals from the respective communication links comprising channel 12 and in response aggregates the successive data slices defined by the SLICE DATA (i) slice data signals into successive words of a packet. The receiver 11 includes a plurality of slice receive circuits 30(0) through 30(3) (generally identified by reference numeral 30(i)). Each of the slice receive circuits 30(i) is connected to respective communication links of the channel 12 to receive the correspondingly-indexed SLICE DATA(i) slice data signals, FRAME (i) frame signal and SL (i) CLK slice (i) clock signal and, as will be described below in connection with FIG. 3, includes buffering for buffering successive slices of a packet. The slice receive circuits 30(i) will the respective successive data slices for a particular packet to be transferred to the downstream in synchrony. That is, for a packet comprising "N+1" words from word "0" to word "N" (generally, "word "n""), the slice receive circuits 30(i) will transfer their respective data slices for word "n" to downstream utilization elements when all of them (that is, the slice receive circuits) have received their respective data slices for word "n." In one embodiment, the SLICE DATA (i) slice data signals and FRAME (i) frame signals are all transmitted in synchrony with their respective SL (i) CLK slice (i) clock signal, in which case they may somewhat be out of phase; in that embodiment, the slice receive circuits 30(i) will jointly determine when all of them have received their respective FRAME (i) frame signals for a particular packet, at which point it can enable data slices to be transferred from the respective slice receive circuits 30(i) to the downstream utilization element in parallel.

Figure 2:
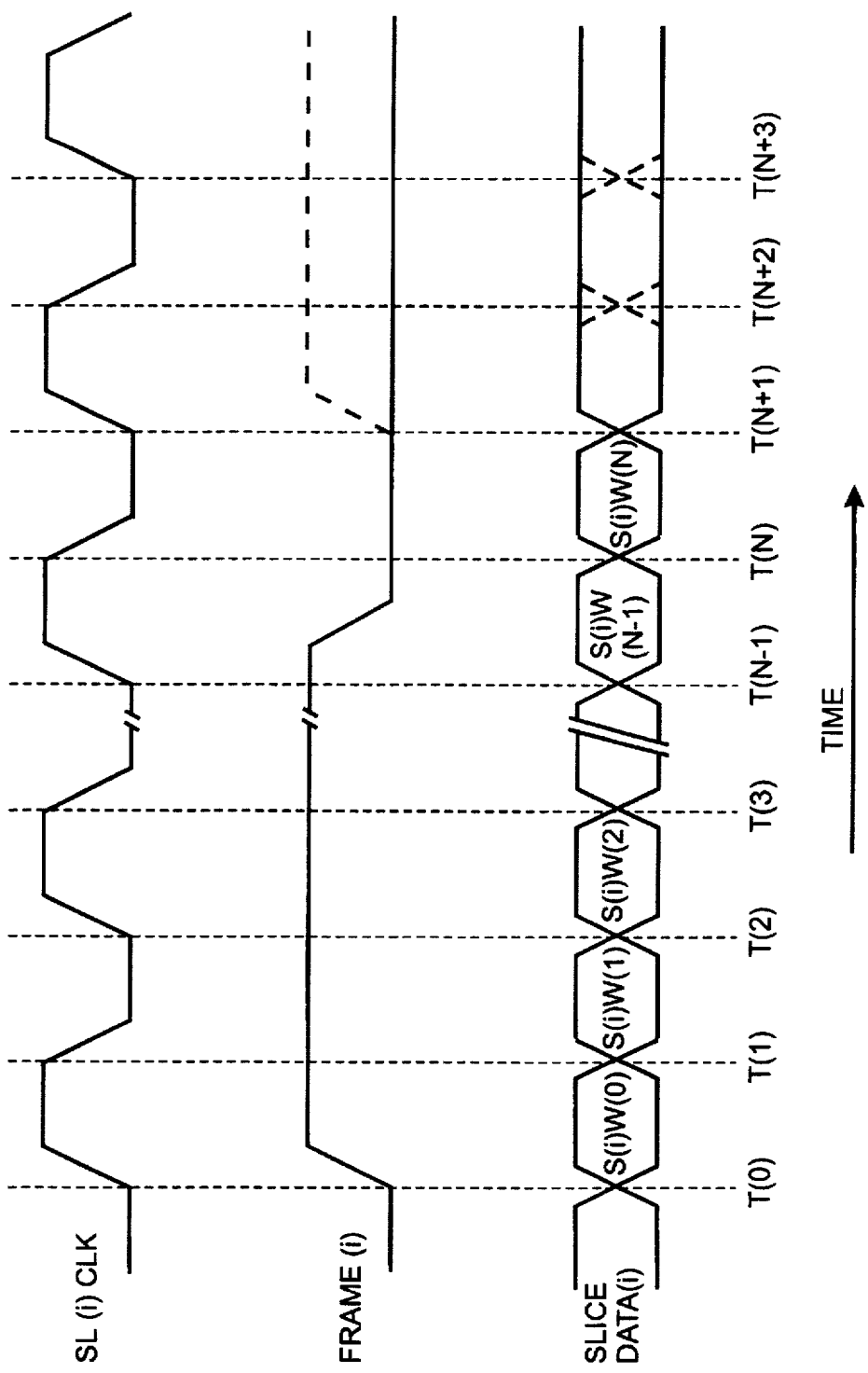
FIG. 2 is a timing diagram useful in understanding the timing of signals transferred between the transmitter and receiver in the digital communications system depicted in FIG. 1.

Before proceeding further, it would be helpful to understand the timing relationships among various SLICE DATA (i) slice data, SL(i) CLK slice (i) clock, and FRAME(i) frame (i) signals transmitted by each slice transmit circuit 21(i) to the correspondingly-indexed slice receive circuit 30(i). FIG. 2 depicts a timing diagram illustrating these timing relationships. With reference to FIG. 2, the SL (i) CLK slice (i) clock signal is a periodic signal defined by a leading (that is, positive-going) edge at times T(0), T(2), and so forth, and a trailing (that is, negative-going) edge at times T(1), T(3), and so forth between therebetween. Each slice transmit circuit 21(i) transmits its respective SL (i) CLK slice (i) clock signal continually over the respective communication link of the channel 12 (FIG. 1).

The FRAME (i) frame signal transmitted by a slice transmitter circuit 21(i) defines the beginning and end of the slice transmitter circuit's respective slices for the successive words for a packet, the slice transmitter circuit's slices being represented by SLICE DATA (i) slice data (i) signals which define successive S(i)W(0) through S(i)W(N) slice (i) word (n) data items (generally identified by abbrevition "S(i)W (n)") for an N+1 word packet. As shown at time T(0) in FIG. 2, the FRAME (i) frame signal is asserted (that is, it has a leading edge) concurrently with the leading edge of the SL (i) CLK slice (l) clock signal, to define the beginning of a packet. Concurrently with the assertion of the FRAME(i) frame signal at time T(0), and concurrently with subsequent trailing and leading edges of the SL (i) CLK slice (i) clock signal at times T(1) through T(N), the slice transmitter circuit 21(i) will transmit S(i)(W)(n) slice (i) word (n) signals defining successive S(i)W(n) slice (i) word (n) data items of respective words of the packet. Between time T(N−1) and time T(N), the slice transmitter circuit 21(i) will negate the FRAME(i) frame (i) signal, to indicate that the slice defined by the SLICE DATA (i) slice data signals transmitted concurrently with the next edge of the SL (i) CLK slice (i) clock signal, namely, the slice transmitted at time T(N) is the last word for the packet. In the illustration depicted in FIG. 2, time T(N) at which the S(i)w(N) slice (i) word (N) data item defining the last word to be transmitted for the packet corresponds to a trailing edge of the SL(i) CLK slice (i) clock, but it will be appreciated that the S(i)W(N) slice (i) word (N) data item may instead be transmitted on the leading edge if there are an odd number of words to be transmitted for the packet.

As will be described below, the slice receive circuit 30(i) will use edges of the SL (i) CLK slice (i) clock signal to control the receiving and subsequent processing of the FRAME(i) frame (i) signal and the S(i)W(n) slice (i) word (n) data item. Thus, the slice transmit circuit 21(i) can negate the FRAME(i) frame signal ahead of time T(N) so that the slice receive circuit 30(i) will note it as being negated at time T(N). The FRAME (i) frame (i) signal can thus be asserted at time T(N+1), as indicated by the dashed line associated with the FRAME(i) frame (i) signal, to indicate the beginning of a subsequent packet, beginning with S(i)W(0) data item (not shown) beginning at time T(N+1) for the subsequent packet. This allows S(i)W(n) data items for successive packets to follow one another without interruption.

As indicated above, each slice receive circuit 30(i) receives the correspondingly-indexed FRAME (i) and SLICE DATA(i) signals using the SL(i) CLK slice (i) clock signal from the correspondingly-indexed slice transmit circuit 21(i), and transfers the received slices to the downstream utilization circuitry in response to a FRM START frame start signal generated by the slice receive circuits 30(i). The receiver 11 operates using a receiver clocking signal (not shown), which is separate and distinct from a transmitter clocking signal used by the transmitter 10. The transmitter clocking signal effectively controls the timings of the edges of the SL (i) CLK slice (i) clock signal edges, the assertion and negation of the FRAME (i) frame (i) signal and the timings of the S(i)W(n) slice (i) word (n) data items transmitted by each of the slice transmit circuits 21(i). Preferably, the receiver clocking signal that controls the receiver 11 will be of the same frequency as the transmitter docking signal that controls the transmitter 10, but it will be appreciated that the two clocking signals may differ in phase, which will need to be accommodated to ensure that the S(i)W(n) slice (i) word (n) data items are properly received. In addition, since the transmitter 10 and receiver 11 are controlled by their individual clocking signals, even small differences in frequency can cause variations in the relative time of the S(i)W(n) slice (i) word (n) data items at the receiver 11 and the receiver's clocking signals which control reception of the S(i)W(n) slice (i) word (n) data items by the receiver, which variations would also need to bee accommodated to ensure that the S(i)W(n) slice (i) word (n) data items are properly received.

Figure 3:
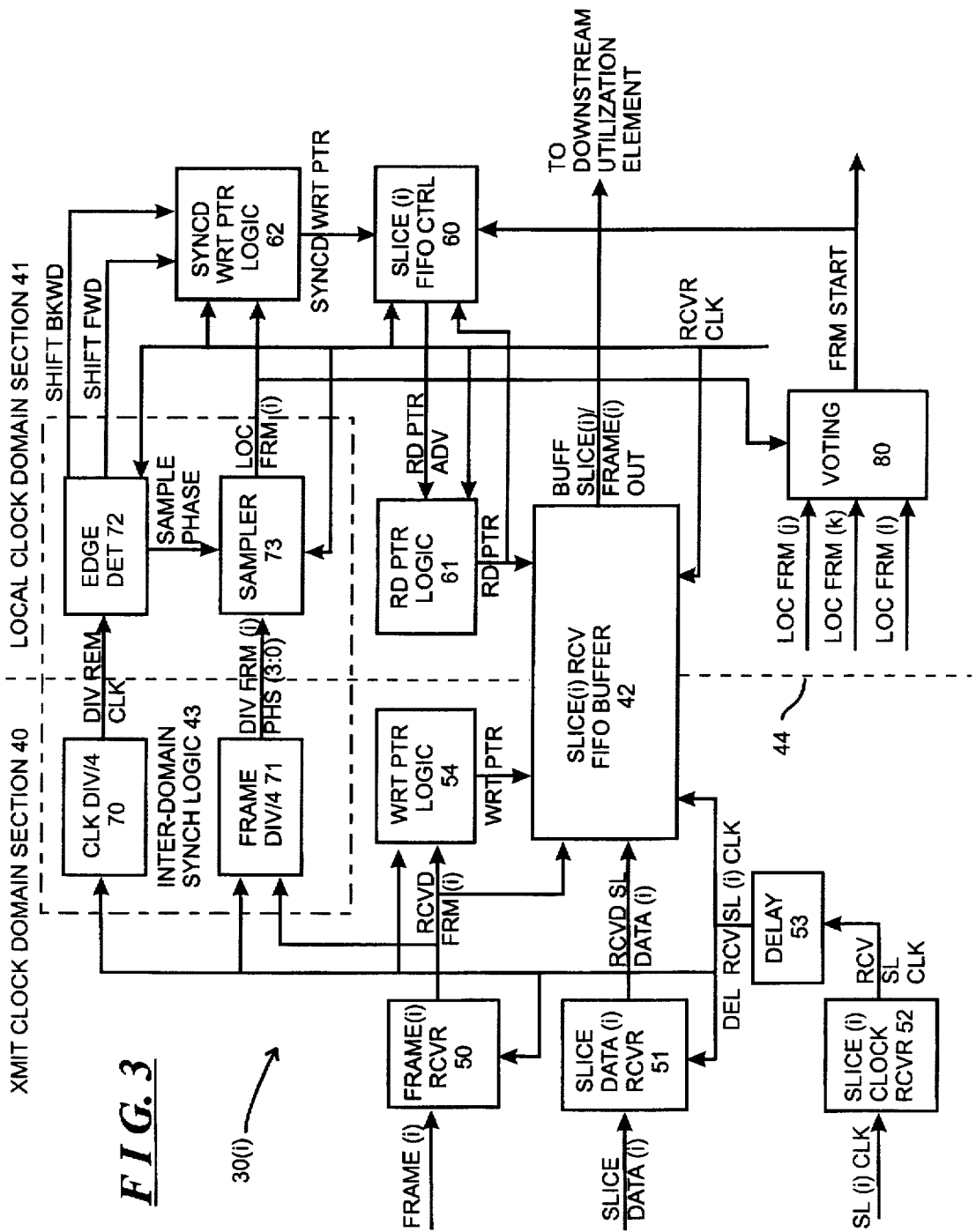
FIG. 3 is a functional block diagram of a portion of the receiver used in the digital communications system depicted in FIG. 1.

Each of the slice receiver circuits 30(i) includes subsystems to accommodate the above-described differences between the phases and frequencies of the timing signals as used by the transmitter 10 and receiver 11. All of the slice receiver circuits 30(0) through 30(3) have similar structure. FIG. 3 depicts a functional block diagram of one such slice receiver circuit, which is identified by reference numeral 30(i). As shown in FIG. 3, the slice receiver circuit 30(i) essentially comprises two sections, namely, a remote clock domain section 40 and a local clock domain section 41, which are bridged by a slice (i) receive FIFO buffer 42 and an inter-domain synchronization logic circuit 43. The remote clock domain section 40, which includes components to the left of the vertical dashed line 44 depicted in FIG. 3, includes components which receive the SLICE DATA (i) signals defining the successive S(i)W(n) slice (i) word (n) data items, the FRAME (i) frame (i) signal and, under control of the SL(i) CLK slice (i) clock signal, store successive the S(i) W(n) slice (i) word (n) data items along with the FRAME(i) frame (i) signal in the slice (i) receive FIFO buffer 42. As descried above, the SL(i) CLK slice (i) clock signal is controlled remotely from the receiver 11, in particular by the transmitter 10.

On the other hand, the local clock domain section 41, which includes components to the right of the vertical dashed line 44 as shown in FIG. 3, includes components for controlling the reading out of successive S(i)W(n) slice (i) word (n) data items, along with the buffered FRAME(i) frame (i) signal from the slice (i) receive FIFO buffer 42 and transferring them, as BUFF SLICE(i)/FRAME(i) OUT buffered slice (i)/frame(i) out signal, to the downstream utilization element for use as described above in connection with FIG. 1. The transfer of successive S(i) W(n) slice (i) word (n) data items from all of the slice receiver circuits 30(i) to the input buffer is coordinated and controlled by the FRM START frame start signal, and by a RCVR CLK receiver clock signal which is controlled locally to the receiver 11 and provided to all of the slice receive circuits 11.

More specifically, and with continued reference to FIG. 3, the remote clock domain section 40 includes a frame (i) receiver circuit 50, a slice data (i) receiver circuit 51, a slice (i) clock receiver circuit 52, a delay circuit 53 and a write pointer logic circuit 54. The slice (i) clock receiver circuit 52 receives the SL (i) CLK slice (i) clock signal from the appropriate line of channel 12 (FIG. 1) and couples it to the input of delay circuit 53 as a RCVD SL CLK received slice (i) clock signal. The delay circuit, in turn, generates, in response to the RCVD SL (i) CLK received slice (i) clock signal, a DEL RCVD SL (i) CLK delayed received slice (i) clock signal, which is delayed from the RCVD SL (i) CLK received slice (i) clock signal by a predetermined time delay. The DEL RCVD SL (i) CLK delayed received slice (i) clock signal, in turn, is coupled to control the frame (i) receiver circuit 50, the slice data receiver circuit 51, the slice (i) receive FIFO buffer 42 and the write pointer logic circuit 54.

The frame (i) receiver circuit 50 and slice data (i) receiver circuit 51 receive the respective FRAME (i) frame (i) and SLICE DATA (i) slice date (i) signals from respective communication links of the channel 12 under control of the DEL RCVD SL (i) CLK delayed received slice (i) clock signal. As shown above in connection with FIG. 2, generally the FRAME (i) frame (i) signal is asserted con with a leading edge of the SL (i) CLK slice (i) clock signal, and the successive S(i) W(n) slice (i) word (n) data items defined by the SLICE DATA (i) signals are also transmitted concurrently with an edge of the SL(i) CLK slice (i) clock signal, and so the delay provided by the delay circuit 53 will preferably be sufficient to accommodate set-up and hold times that may be necessary to allow the FRAME (i) frame (i) and SLICE DATA (i) slice data (i) signals to be properly received by the respective receivers 50 and 51.

The slice data (i) receiver circuit 51 provides the received SLICE DATA (i) slice data (i) signals as RCVD SL DATA (i) received slice data (i) signals to respective input terminals of the slice (i) receive FIFO buffer circuit 42. Concurrently, the frame (i) receiver circuit 50 provides the received FRAME (i) signal as a RCVD FRM (i) received frame (i) signal to one input of the slice (i) receive FIFO buffer circuit 42. As indicated above, the slice (i) receive FIFO buffer 42 also receives the DEL RCVD SL (i) CLK delayed received slice (i) clock signal from the delay circuit 53 and will store the S(i)W(N) slice (i) word (n) data item defined by the RCVD SL DATA (i) received slice data (i) signals concurrently with the RCVD FRM (i) received frame (i) signal on successive edges of the DEL RCVD SL (i) CLK delayed received slice (i) clock signal.

As is conventional, the FIFO buffer circuit 42 comprises a series of storage locations (not separately shown), each of which is identified by an address. The particular storage location in which the S(i)W(N) slice (i) word (n) data item and the RCVD FRM (i) received frame (i) signal are stored is identified by a WRT PTR write pointer signal generated by the write pointer logic circuit 54. Generally, the WRT PTR write pointer signal identifies the next location into which the S(i)W(n) slice (i) word (n) data item and RCVD FRM (i) received frame (i) signal are to be stored. Accordingly, the location identified by the WRT PTR write pointer signal for the first S(i)W(0) slice (i) word (0) data item for a packet will be controlled by the write pointer logic circuit 54 during the loading of the last S(i)W(N) slice (i) word (N) data item for the previous packet, if any. Effectively, the write pointer control logic 54 will advance the location by the WRT PTR write pointer signal for each edge of the DEL RCV SL (i) CLK delayed receive slice (i) clock signal while the RCVD FRM (i) received frame (i) signal is asserted, so the WRT PTR write pointer will be advanced, to point to the next location into which each subsequent S(i)W(n) slice (i) word (n) data item will be stored, contemporaneously with the storage of the S(i)W(n−1) slice (i) word (n−1) data item in the slice (i) receive FIFO buffer 42. It will be appreciated that, when the write pointer control circuit 54 advances the WRT PTR write pointer signal to point to the last storage location in the slice (i) receive FIFO buffer 42, it can reset the WRT PTR write pointer signal to point to the first location in the buffer 42, and store subsequent S(i)W(n) slice (i) word (n) data items from the first storage location in the buffer 42.

When the RCVD FRM (i) signal is negated proximate the end of the packet, the write pointer control logic 54, concurrently with successive edges of the DEL RCV SL (i) CLK delayed receive slice (i) clock signal, will continue advancing the WRT PTR write pointer sufficiently to accommodate the last S(i)W(n) slice (i) word (N) data item for the packet, and eventually to point to the next location in the slice (i) receive FIFO buffer 42 following the last S(i)W(n) slice (i) word (N) data item in the buffer 42.

As described above, the local clock domain section 41 includes components for controlling the reading out of successive S(i)W(n) slice (i) word (n) data items, along with the buffered FRAME(i) frame (i) signal from the slice (i) receive FIFO buffer 42 and transferring them, as BUFF SLICE(i)/FRAME(i) OUT buffered slice (i)/frame(i) out signal, to the downstream utilization element for use. In particular, the local clock domain section includes a slice (i) FIFO control circuit 60, a read pointer logic circuit 61, a synchronized write pointer circuit 62, and a local voting circuit 63, which operate under control of the RCVR CLK receiver clock signal, which represents the local clock signal which controls the receiver 11.

The read pointer logic circuit 61, under control of the slice (i) FIFO control circuit 60, generates a RD PTR read pointer signal, which points to the next location in the slice (i) receive FIFO buffer 42 to be read, that is, whose buffered RCVD FRM (i) received frame (i) signal and S(i)W(n) slice (i) word (n) data item, are to be coupled as the BUFF SLICE (i)/FRAME(i) OUT buffered slice (i)/frame (i) out signal to the downstream utilization element (FIG. 1). Analogously to the WRT PTR write pointer signal generated by the write pointer logic circuit 54, the RD PTR read pointer signal generated by the read pointer logic circuit 61 points to the next location in the slice (i) receive FIFO buffer 42 to be read. In that embodiment, the contents of the storage location in buffer 42 pointed to by the RD PTR read pointer signal will be continually coupled to the downstream utilization element as the BUFF SLICE (i) FE(i) OUT signal.

The read pointer logic circuit is enabled to advance, to point to successive locations in the slice (i) receive FIFO buffer 42 on successive edges of the RCVR CLK receiver clock signal from the receive control signal when a RD PTR ADV read pointer advance signal from the slice (i) FIFO control circuit 60 is asserted. The slice (i) FIFO control circuit 60, in turn, controls the RD PTR ADV read pointer advance signal in response to a SYNCD WRT PTR synchronized write pointer signal from the synchronized write pointer logic 62. Generally, a control circuit for a FIFO buffer, such as slice (i) receive FIFO buffer 42, determines whether the FIFO buffer contains a data item that can be read by reference to a read pointer, such as is provided by the RD PTR read pointer signal generated by the read pointer logic circuit 61, and a write pointer, such as is provided by the WRT PTR write pointer signal from the write pointer logic circuit 54. In particular, if the read pointer points to the same location as the write pointer, the FIFO buffer is empty, since the next location into which a data item is to be written, which is pointed to by the write pointer, is the same as the next location from which a data item is to be read, which is pointed to by the read pointer. In that case, the FIFO buffer's control circuitry will disable the read pointer from advancing, until the write pointer is advanced indicating that data items have been added to the FIFO buffer; accordingly, the FIFO buffer's control circuitry will ensure that the read pointer points to locations in the FIFO buffer that are "behind" or coincident with the location pointed to by the write pointer. However, while the read pointer points to location that is behind the location pointed to by the write pointer, the FIFO buffer's control circuitry can advance the read pointer, enabling successive locations in the FIFO buffer to be read.

As described above, there may be a difference in phasing between the SL (i) CLK slice (i) clock signal as received by the receiver 11 and the clock signal used by the receiver to transfer information from the slice receiver circuits 30(i), which phasing difference may result in metastability in the data item stored in a location in the slice (i) receive FIFO buffer 42 if the local clock domain section 41 attempts to read the location concurrently with storage of the data item therein. Accordingly, the local clock domain section 41 maintains a synchronized write pointer, which is generated by the synchronized write pointer logic circuit 62 and represented by a SYNCD WRT PTR synchronized write pointer signal, under control of the inter-domain synchronization logic circuit 43. The synchronized write pointer represents the actual write pointer, represented by the WRT PTR write pointer signal, synchronized into the local clock domain by the inter-domain synchronization logic circuit 43. As noted above, the WRT PTR write pointer signal controls the location in slice (i) receive FIFO buffer 42, into which the S(i)W(n) slice (i) word (n) data item and RCVD FRM (i) received frame (i) signal is stored, and by synchronizing the write pointer into the local clock domain, the S(i)W(n) slice (i) word (n) data item and RCVD FRM(i) received frame (i) signal will be properly stored and settled in the storage location in FIFO buffer 42 before the local clock domain section 41 attempts to read the storage location.

To accomplish that, the inter-domain synchronization logic 43 receives the RCVD FRM(i) received frame (i) signal and the DEL RCV SL (i) CLK delayed received slice (i) clock signal from various components of the remote clock domain section 40, and the RCVR CLK receiver clock signal from the local clock domain and generates in response a LOC FRM(i) local frame (i) signal that represents the RCVD FRM (i) received frame (i) signal synchronized into the local clock domain controlled by the RCVR CLK receiver clock signal. As described above, the RCVD FRM (i) received frame (i) signal, along with the DEL RCV SL (i) CLK delayed receive slice (i) clock signal, controls the advancement of the write pointer generated by the write pointer logic circuit 54, and the LOC FRM (i) local frame (i) signal controls the advancement of the synchronized write pointer by the synchronized write pointer logic circuit 62. The slice (i) FIFO control circuit 60 uses the synchronized write pointer defined by the SYNCD WRT PTR synchronized write pointer signal in controlling the advancement by the read pointer logic of the read pointer defined by the RD PTR read pointer signal, instead of the actual write pointer generated by the write pointer logic circuit 54. The inter-domain synchronization logic 43 delays the assertion and negation of the LOC FRM (i) local frame (i) signal so that assertion and negation the SYNCD WRT PTR synchronized write pointer signal will, in turn, be sufficiently delayed from that of the actual WRT PTR write pointer signal to ensure that the S(i)W(n) slice (1) word (n) data item and RCVD FRM (i) received frame (i) signal will be properly stored in a storage location in the slice (i) receive FIFO buffer by the circuitry in the remote clock domain section 40, before that storage location is pointed to by the RD PTR read pointer signal.

The inter-domain synchronization logic circuit will be described in connection with the functional block diagram in FIG. 3 and an illustrative timing diagram in FIG. 4. The illustrative timing diagram in FIG. 4 contains idealized representations of the respective signals shown therein, with signal edges being represented by vertical lines ignoring rise and fall shaping which would be present in actual signals. As shown in FIG. 3, the inter-domain synchronization logic circuit 43 includes a clock signal divider circuit 70, a frame signal divider circuit 71, an edge detector 72 and a sampler circuit 73. The clock signal divider circuit 70 receives the DEL RCV SL (i) CLK delayed receive slice (i) clock signal and generates an output DIV REM CLK (i) divided remote clock (i) signal at one-fourth the frequency of the DEL RCV SL (i) CLK delayed receive slice (i) clock signal, which it provides to the edge detector circuit 72. Essentially, with reference to the timing diagram in FIG. 4, the DEL RCV SL (i) CLK delayed receive slice (i) clock signal, in relation to the DIV REM CLK divided remote clock signal, has four phases, identified in FIG. 4 by legends PHS 1 through PHS 4, with phase PHS 1 beginning at the leading edge of the DIV REM CLK divided remote clock signal at time T(0) in FIG. 4, and each successive phases PHS 2 through PHS 4 starting at successive leading edges of the DIV REM CLK divided remote clock signal.

The frame signal divider circuit 71 receives the RCVD FRM (i) received frame (i) signal and the DEL RCV SL (i) CLK delayed receive slice (i) clock signal and generates four DIV FRM (i) PHS (3:0) divided frame (i) phase (3:0) signals, each corresponding to the RCVD FRM (i) received frame (i) signal, divided by four, on separate phases of the DEL RCV SL (i) CLK delayed receive slice (i) clock signal. As described above, the FRAME (i) frame signal is asserted generally concurrently with a leading edge of the correspondingly-indexed SL (i) CLK slice (i) clock signal, and so the RCVD FRM (i) received frame (i) signal will also be asserted generally concurrently with a leading edge of the DEL RCV SL (i) CLK delayed receive slice (i) clock signal. Accordingly, if the RCVD FRM (i) received frame (i) signal is asserted concurrently with the leading edge of phase "p" of the DEL RCV SL (i) CLK delayed receive slice (i) clock signal, the frame signal divider circuit 71 will assert the four DIV FRM PHS (3:0) signals in synchrony with the respective phase PHS 1 through PHS 4 of the DIV REM CLK divided remote clock signal The edge detector circuit 72 receives the DIV REM CLK signal from the clock signal divider circuit and the RCVR CLK receiver clock signal and generates a SAMPLE PHASE signal, which is coupled to the sampler circuit 73. As with the DEL RCV SL (i) CLK delayed received slice (i) clock signal, the RCVR CLK receiver clock signal used by the receiver 11 also defines four phases beginning at successive leading edges of the RCVR CLK receiver clock signal. The leading edges defining the beginning of each of the four phases is shown in FIG. 4 by the arrows associated with respective legends P1 through P4. The edge detector circuit 72 identifies the two phases of the RCVR CLK receiver clock whose leading edges bracket the leading edge of the DIV REM CLK divided remote clock signal. In the illustrative timing diagram depicted in FIG. 4, the leading edge of the DIV REM CLK divided remote clock signal, which is coincident with the dashed vertical line at time T(0), is illustrated as falling between the leading edges of phases P4 and P1 of the RCVR CLK receiver clock signal. Depending on the relative phasing and frequencies of the SL (i) CLK slice (i) clock signal from the transmitter 10 and the RCVR CLK receiver clock signal used by the receiver 11, the particular phases of the RCVR CLK receiver clock signal between which the leading edge of the DIV REM CLK divided remote clock signal occurs may differ from that shown in the illustrative timing diagram depicted in FIG. 4.

The edge detector circuit 72 generates the SAMPLE PHASE signal to identify the particular one of the phases P1 through P4 of the RCVR CLK receiver clock signal to be used to sample the DIV FRM PHS (3:0) divided frame phase (3:0) signals. The identified phase P1 through P4 is selected to ensure that, when the RCVD FRM (i) received frame (i) signal is asserted to indicate the beginning of the packet, the LOC FRM (i) local frame (i) signal will be asserted a sufficient time thereafter to ensure that the S(i)W(0) slice (i) word (0) data item, which corresponds to the first slice of a new packet, and the RCVD FRM (i) received frame (i) signal have been properly stored in the slice (i) receive FIFO buffer 42. The phases PI through P4 of the RCVR CLK receiver which will provide this time are phases P2 and n in the illustrative embodiment, and so the edge detector circuit 72 will generate the SAMPLE PHASE signal to identify one of these phases. In one embodiment, the SAMPLE PHASE signal will select phase P2, although it will be appreciated that phase P3 may instead be selected.

The sampler circuit 73 receives the SAMPLE PHASE signal and the DIV FRM PHS (3:0) divided frame phases (3:0) signal, and generates, in response thereto, the LOC FRM (i) local frame (i) signal as the RCVD FRM (i) received frame (i) signal synchronized into the local clock domain. In particular, with further reference to the illustrative timing diagram in FIG. 4, since the SAMPLE PHASE signal from the edge detector 72 identifies phases P2 and P3, the sampler circuit 73 will sample the DIV FRM PHS 2 divided frame phase 2 and DIV FRM PHS 3 divided frame phase 3 signals coincident with the appropriate rising edges of the phases P1 through P4 of the RCVR CLK receiver clock signal, and assert the LOC FRM (i) local frame (i) signal if the particular DIV FRM PHS 2 divided frame phase 2 or DIV FRM PHS 3 divided frame phase 3 signal is asserted. Thus, as shown in the illustrative timing diagram in FIG. 4, since the DIV FRM (i) PHS (2) divided frame (i) phase (2) signal is asserted at time T(1), the sampler circuit 73 will, on the next leading edge of phase P2 of the RCVR CLK receiver clock signal at time T(2), assert the LOC FRM (i) signal, thereby to synchronize the RCVD FRM (i) received frame (i) signal into the local clock domain of the receiver 11. At this point, the synchronized write pointer logic circuit 62 can, on successive ticks of the RCVR CLK receiver clock signal, advance the SYNCD WRT PTR synchronized write pointer signal, which, in turn, will enable the slice (i) FIFO control circuit 60 to enable the read pointer logic go advance the read pointer.

The SAMPLE PHASE signal generated by the edge detector thus accommodates variations in phases between the SL (i) CLK slice (i) clock signal and the RCVR CLK receiver clock signal as described above. As further described above, the SL (i) CLK slice (i) clock signal and the RCVR CLK receiver clock may also differ in frequency, which may cause the synchronized write pointer generated by the synchronized write pointer circuit 62 to advance faster or slower than the actual write pointer generated by the write pointer logic circuit 54. The edge detector circuit 72 also generates SHIFT BKWD shift backward and SHIFT FWD shift forward to enable the synchronized write pointer logic 62 to correct the synchronized write pointer to accommodate the frequency difference.

Figure 4:
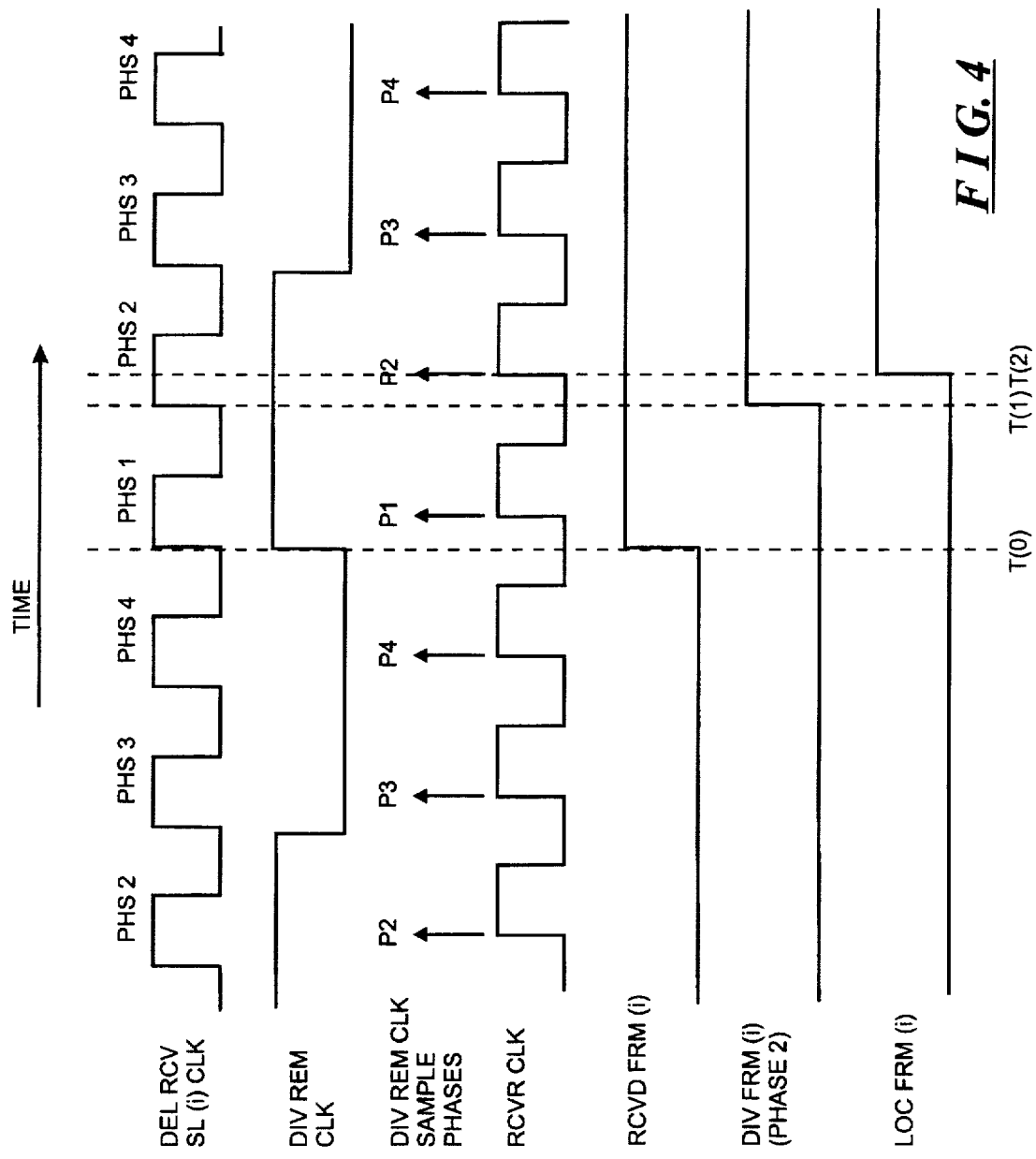
FIG. 4 is a timing diagram useful in understanding the operation of an inter-domain synchronization logic circuit, used in the portion of the receiver depicted in FIG. 3.

In particular, with continued reference to the illustrative timing diagram in FIG. 4, if the frequency of the RCVR CLK signal is higher than the frequency of the SL (i) CLK slice (i) clock signal, the relative timings of the edges of the DEL RCV SL (i) CLK delayed receive slice (i) clock signal and the RCVR CLK receiver clock signal will essentially result in the RCVR CLK signal shifting to the left (as shown in FIG. 4) relative to the DEL RCV SL (i) CLK delayed receive slice (i) clock signal. In that case, the edge detector circuit 72 will determine that the phases P1 through P4 of the RCVR CLK receiver clock signal, between which the DIV REM CLK divided remote clock signal is asserted, will shift, from between phases P4 and P1 to, for example, between phases P1 and P2. It should be noted that the higher frequency of the RCVR CLK receiver clock signal, relative to the SL (i) CLK slice (i) clock signal, will enable the synchronized write pointer logic circuit 62 to advance the synchronized write pointer faster than the write pointer logic circuit 54 advances the actual write pointer, and so when the edge detector circuit 72 detects such as shift, it will assert the SHIFT BKWD shift backward signal to disable the synchronized write pointer logic circuit 62 from advancing the synchronized write pointer at the next edge of the RCVR CLK receiver clock signal, effectively retarding advancement of synchronized write pointer.

On the other hand, if the frequency of the RCVR CLK signal is lower than the frequency of the SL (i) CLK slice (i) clock signal, the relative timings of the edges of the DEL RCV SL (i) CLK delayed receive slice (i) clock signal and the RCVR CLK receiver clock signal will essentially result in the RCVR CLK signal shifting to the right (as shown in FIG. 4) relative to the DEL RCV SL (i) CLK delayed receive slice (i) clock signal. In that case, the edge detector circuit 72 will determine that the phases P1 through P4 of the RCVR CLK receiver clock signal, between which the DIV REM CLK divided remote clock signal is asserted, will shift, from between phases P4 and P1 to, for example, between phases P3 and P4. It should be noted that the lower frequency of the RCVR CLK receiver clock signal, relative to the SL (i) CLK slice (i) clock signal, will enable the synchronized write pointer logic circuit 62 to advance the synchronized write pointer slower than the write pointer logic circuit 54 advances the actual write pointer, and so when the edge detector circuit 72 detects such as shift, it will assert the SHIFT FWD shift forward signal to enable the synchronized write pointer logic circuit 62 from to advance the synchronized write pointer twice at the next edge of the RCVR CLK receiver clock signal, effectively advancing the synchronized write pointer faster at that edge.

The inter-domain synchronization logic circuit 43 will perform similar operations when the RCVD FRM (i) received frame (i) signal is negated indicating the end of the packet, thereby to negate the LOC FRM (i) local frame (i) signal. Accordingly, the inter-domain synchronization logic circuit 43 synchronizes the RCVD FRM (i) received frame signal from the remote clock domain portion into the local clock domain for the slice receive circuit 30(i).

The slice (i) FIFO control circuit 60, in addition to controlling the read pointer logic circuit 61, may also generate RCV FIFO (I) STAT receive FIFO (i) status signals (not shown). Generally, the RCV FIFO (1) STAT receive FIFO (i) status signals indicate in particular whether the slice (i) receive FIFO buffer 42 is empty or whether the buffer 42 contains at least one S(i)W(n) slice (i) word (n) data item that can be transferred to the downstream utilization element. The slice (i) FIFO control circuit 60 may generate the RCV FIFO (I) STAT receive FIFO (i) status signals in response to the synchronized write pointer generated by the synchronized write pointer logic circuit 62 and the read pointer generated by the read pointer logic circuit 61. Generally, if the synchronized write pointer and the read pointer point to the same location in the slice (i) receive FIFO buffer 42, the slice (i) FIFO control circuit 60 can determine that the slice (i) receive FIFO buffer 42 is empty, but if the pointers point to different locations, the slice (i) FIFO control circuit 60 will determine that the slice (i) receive FIFO buffer 42 is not empty; this will occur even if the transmit clock domain section 40 has written a data item into the location in buffer 42, since the timing of writing of the data item is not synchronized into the local clock domain and the data item may be in a metastable state.

As described above, all of the slice receive circuits 30(i) will transfer their respective "n-th" slices for the "n-th" word of a packet to the downstream utilization circuitry simultaneously. In that operation, all of the slice receive circuits 30(i) can begin transferring their respective first S(i)W(0) slice (i) word (0) data item for a packet when all of them have received the data item, and thereafter transfer the successive data items on successive edges of the RCV CLK receive clock signal. The local voting circuit 63 generates a FRM START frame start signal to indicate when all of the slice receive circuits 30(i) have received the first S(i)W(0) slice (i) word (0) data item for a packet. As described above, the assertion by a slice receive circuit 30(i) of its respective LOC FRM (i) local frame (i) signal indicates that the slice receive circuit 30(i) has received the first S(i)W(0) slice (i) word (0) data item for a packet, and further that the slice (i) receive FIFO buffer 42 is in condition to transfer the data item to the downstream utilization element. Accordingly, when the LOC FRM (i) local frame (i) signals from all of the slice receive circuits 30(i) are asserted, the local voting circuit 63 will assert the FRM START frame start signal, at which point all of the slice receive circuits 30(i) will begin transferring successive ones of the respective S(i)W(n) slice (i) word (n) data items.

In one embodiment, the local voting circuit is in the form of a wired "OR" circuit. In that embodiment, the slice receive circuits 30(i) generate all of the LOC FRM(i) local frame signals negated at a high voltage level, and asserted at a low voltage level and the FRM START frame start signal is also negated at a high voltage level, and asserted at a low voltage level. Thus, when any of the slice receive circuits 30(i) is maintaining its LOC FRM(i) local frame signal at a high voltage level, indicating that the LOC FRM(i) local frame signal is negated, the wired "OR" circuit will also maintain the FRM START frame start signal at a high voltage level, thereby maintaining the FRM START frame start signal in a negated condition. However, when all of the slice receive circuits 30(i) are maintaining its LOC FRM(i) local frame signal at a low voltage level, indicating that their LOC FRM(i) local frame signal are asserted, the wired "OR" circuit will also maintain the FRM START frame start signal at a low voltage level, thereby maintaining the FRM START frame start signal in an asserted condition.

The series of operations performed by the transmitter 10 and receiver 11 in transferring a packet will be described in connection with FIGS. 1 through 4. Initially, at the transmitter 10, under control of the SLICE XMIT CTRL slice transmit control signal, words comprising the packet are received as respective slices by the slice transmit circuits 21(i) and transmitted over channel 12 as SLICE DATA (i) slice data (i) signals defining successive S(i)W(n) slice (i) word (N) data items. The slice transmit circuits 21(i) will assert the FRAME (i) signal concurrent with the first S(i) W(0) slice (i) word (0) data item, and maintain it in an asserted condition for successive S(i)W(n) slice (i) word (n) data items until it negates it (that is, the Frame (i) signal) concurrent with transmission of the S(i) W(N−1) slice (i) word N−1) data item. As described above, the SLICE DATA (i) slice data (i) signals and the FRAME(i) frame (i) signal are transmitted by the respective slice transmit circuit 21(i) synchronously with SL (i) CLK slice (i) clock signal, which the slice transmit circuits 21(i) will continually transmit over channel 12.

The SLICE DATA (i) slice data (i) signals defining successive S(i)W(n) slice (i) word (N) data items, the FRAME (i) frame (i) signal and the SL(i) CLK slice (i) clock signal from each slice transmit circuit 21(i) are received by the respective slice receive circuits 30(i). In particular, when the slice receive circuit 30(i) determines that the FRAME (i) frame (i) signal is asserted, concurrent with reception of the SLICE DATA (i) slice data (i) signals for the first S(i)W(0) slice (i) word (0) data item, and while the FRAME (i) remains asserted concurrent with receipt of subsequent data items, the successive data items will be stored in the slice (i) receive FIFO buffer 42. In that operation, the asserted FRAME (i) frame (i) signal will enable the write pointer logic circuit 54 to advance the write pointer 54. In addition, the inter-domain synchronization logic circuit 43 will control the LOC FRM (i) local frame (i) signal, corresponding to the FRAME (i) signal synchronized into the local clock domain controlled by the RCVR CLK receiver clock signal that controls the receiver 11.

When the LOC FRM (i) local frame (i) signal is asserted, the synchronized write pointer logic circuit 62 will be enabled to advance the synchronized write pointer, which the slice (i) FIFO control circuit 60 uses, along with the RCV FIFO CTRL receive FIFO control signal to control the advancement of the read pointer by the read pointer logic circuit 61. The inter-domain synchronization logic circuit 43 can also control the SHIFT BKWD shift backward and SHIFT FWD shift forward signals as described above to control the advancement by the synchronized write pointer logic circuit 62 of the synchronized write pointer as described above to accommodate for different frequencies of the clocking signals in the remote and local clock domain sections 40 and 41. In addition, the slice (i) FIFO control circuit 60 will generate the RCV FIFO (i) STAT receive FIFO (i) status signal in response to the synchronized write pointer from the synchronized write pointer logic circuit 62 and the read pointer from the read pointer logic circuit 61, to indicate whether the slice (i) receive FIFO buffer 42 is empty or not empty.

When the LOC FRM (i) local frame (i) signals generated by all of the slice receive circuits 30(i) are asserted, the local voting circuit 63 will assert the FRM START frame start signal. After the FRM START frame start signal is asserted, the slice (i) FIFO control circuit 60 will enable successive S(i)W(n) slice (i) word (n) data items to be transferred from the slice receive circuits 30(i) to the downstream utilization elements (not shown).

The transmitter 10 and receiver 11 can repeat these operations for each successive packet to be transferred therebetween.

The invention provides a number of advantages. In particular, it provides an arrangement for quickly synchronizing digital communications between a transmitter and a receiver which are operating under control of respective clocking signals, which are preferably of the same or nearly the same frequency, but which may be out of phase relative to each other. In addition, the invention accommodates for small differences in frequency between the clocking signals controlling the transmitter and receiver. The invention accomplishes these quickly, without requiring any a priori knowledge of differences in frequency or phase of the respective clocking signals.

It will be appreciated that a number of modifications may be made to the system described above in connection with FIGS. 1 through 4. For example, although the system has been described as transferring successive S(i)W(n) slice (i) word (n) data items concurrent with both leading and trailing edges of the SL (i) CLK slice (i) clocking signal, it will be appreciated that the data items may instead be transferred concurrent with only the leading or trailing edge of the clocking signal. In addition, although the invention has been described as comprising a plurality of slice transmit and receive circuits 21(i) and 30(i), it will be appreciated that only one transmit and receive circuit need be provided; in that case, the local voting circuit 63 would not be necessary.

Further, it will be appreciated that the system can efficiently handle "multi-hop" packet transfers, by enabling the receiver 11 to transfer packets to another transmitter (not shown) as the downstream utilization element.

It will be appreciated that a system in accordance with the invention can be constructed in whole or in part from special purpose hardware or a general purpose digital processor, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by letters patent of the United States is:

1. An information transfer system for transferring information, in the form of at least one digital data word, from a source operating in a first clock signal domain defined by a first clock signal, to a destination operating in a second clock signal domain defined by a second clock signal, said information transfer system comprising:

A. a buffer;

B. a buffer storage element configured to store said at least one data word in said buffer under control of a data word present indication provided by said source;

C. a buffer retrieval element configured to retrieve said at least one data word from said buffer for provision to said destination under control of a synchronized data word present indication; and D. a synchronizer configured to generate the synchronized data word present indication in response to the first clock signal, said second clock signal, and said data word present indication, the synchronized data word present indication conforming to the data word present indication synchronized from the first clock signal domain into the second clock signal domain.

2. An information transfer system as defined in claim 1 in which said buffer retrieval element is further configured to transfer said at least one data word to a downstream utilization element operating in said second clock domain.

3. An information transfer system as defined in claim 1 in which:

A. said information comprises a packet comprising a plurality of data words transferred in series in synchrony with said first clock signal, the data word present indication indicating a first in said packet;

B. said buffer comprises a FIFO buffer comprising a series of storage locations each for buffering a data word;

C. said buffer storage element comprises i. a write pointer configured to identify one of said storage locations in which a data word is to be written;

ii. a data word storage element responsive to said first clock signal configured to enable a said data word from said packet to be stored in one of said storage locations in said FIFO buffer identified by said write pointer; and ii. a write pointer control element responsive to said data word present indication configured to advance said write pointer in synchrony with said first clock signal to identify successive ones of said storage locations as successive data words from said packet are buffered in ones of said storage locations.

4. An information transfer system as defined in claim 3 in which said buffer retrieval element includes a synchronized write pointer configured to control the retrieval of data words from said FIFO buffer, the synchronized write pointer being advanced by a synchronized write pointer control element in synchrony with the first clock signal in response to the synchronized data word present indication.

5. An information transfer system as defined in claim 3 in which said FIFO comprises a predetermined number of storage locations each identified by an address from a low order address to a high order address, the write pointer control element configured to enable the write pointer to identify successive ones of said storage locations and to, after the write pointer points to the high order address, reset the write pointer to point to the low order address.

6. An information transfer system as defined in claim 1 in which:

A. said information comprises a packet comprising a plurality of data words transferred in series in synchrony with said first clock signal, the data word present indication indicating a first in said packet;

B. said buffer comprises a FIFO buffer comprising a series of storage locations each for buffering a data word;

C. said buffer retrieval element comprises:
  i. a read pointer configured to identify one of said storage locations from which a data word is to be retrieved;
  ii. a synchronized write pointer configured to provide an identification of one of said storage locations into which a data word is to be written, synchronized into said second clock domain;
  ii. a data word retrieval element, responsive to said second clock signal and said synchronized write pointer, configured to enable a said data word from said packet to be retrieved from one of said storage locations in said FIFO buffer identified by said read pointer, the data word retrieval element advancing said read pointer as each data word is retrieved; and
  ii. a synchronized write pointer control element responsive to said synchronized data word present indication for advancing said write pointer in synchrony with said second clock signal to identify successive ones of said storage locations as the buffer storage element buffers successive data words from said packet in ones of said storage locations.

7. An information transfer system as defined in claim 6 in which said FIFO comprises a predetermined number of storage locations each identified by an address from a low order address to a high order address, the data word retrieval element being configured to enable the read pointer to identify successive ones of said storage locations and to, after the read pointer points to the high order address, reset the read pointer to point to the low order address.

8. An information transfer system as defined in claim 6 in which said FIFO comprises a predetermined number of storage locations each identified by an address from a low order address to a high order address, the synchronized write pointer control element configured to enable the synchronized write pointer to identify successive ones of said storage locations and to, after the synchronized write pointer points to the high order address, reset the synchronized write pointer to point to the low order address.

9. An information transfer system as defined in claim 6 in which said data word retrieval element is configured to advance said read pointer so as to maintain a predetermined minimum difference between said the storage location identified by said read pointer and the storage location identified by said synchronized write pointer.

10. An information transfer system as defined in claim 1 in which each of said data word present indication and said synchronized data word present indication has a plurality of conditions, and each of said first and second clock signals defines a series of timing indications, the synchronizer comprising:
  A. a sample timing indication signal generator responsive to said first and second clock signals configured to identify one of said second clock signal timing indications as a sample timing indication; and
  B. a sampler configured to sample said data word present indication in synchrony with the identified one of said second clock signal timing indication and condition the synchronized data word present indication in accordance with the condition of said data word present indication.

11. An information transfer system as defined in claim 10 in which the each of the first and second clock signals comprise a series of pulses comprising a series of alternating leading and trailing edges defining the clock signals' respective timing indications, the sample timing indication signal generator comprising:
  A. a clock divider configured to divide the first clock signal by a predetermined value, thereby to generate a divided first clock signal, the divided first clock signal also comprising a series of pulses comprising a series of alternating leading and trailing edges; and
  B. a timing indication selector configured to generate said sample timing indication a predetermined number of pulses of said second clock signal following a predetermined one of the leading or trailing edge of the first clock signal.

12. An information transfer system as defined in claim 11 in which successive pulses of the second clock signal are assigned a series of respective phase identifiers, the number of successive phase identifiers corresponding to the predetermined value, the timing indication selector selecting a phase identifier for a second clock signal as the sample timing indication.

13. An information transfer system as defined in claim 12 in which
  A. said information comprises a packet comprising a plurality of data words transferred in series in synchrony with said first clock signal, the data word present indication indicating a first in said packet;
  B. said buffer comprises a FIFO buffer comprising a series of storage locations each for buffering a data word;
  C. said timing indication selector generating a phase shift indication if the phase identifier for the phase identifier selected thereby changes;
  D. said buffer retrieval element comprises:
   i. a read pointer configured to identify one of said storage locations from which a data word is to be retrieved;
   ii. a synchronized write pointer configured to provide an identification of one of said storage locations into which a data word is to be written, synchronized into said second clock domain;
   ii. a data word retrieval element, responsive to said second clock signal and said synchronized write pointer, configured to enable a said data word from said packet to be retrieved from one of said storage locations in said FIFO buffer identified by said read pointer, the data word retrieval element advancing said read pointer as each data word is retrieved; and
   ii. a synchronized write pointer control element responsive to said synchronized data word present indication, said phase shift identification and said second clock signal configured to advance said write pointer to identify successive ones of said storage locations as the buffer storage element buffers successive data words from said packet in ones of said storage locations.

14. An information transfer system as defined in claim 1, each data word comprising a plurality of slices, the information transfer system comprising a plurality of slice transfer subsystems each for transferring a slice, each slice transfer subsystem comprising a said buffer, a said buffer storage element, a said buffer retrieval element, and a said synchronizer, said information transfer system further comprising a control element for controlling the buffer retrieval elements of all of said slice transfer subsystems to concurrently transfer all of the slices comprising said at least one data word to a downstream utilization element operating in said second clock domain.

15. An information transfer method for transferring information, in the form of at least one digital data word, from an source operating in a first clock signal domain defined by a first clock signal, to a destination operating in a second clock signal domain defined by a second clock signal, said information transfer system comprising:

A. providing a buffer;

B. storing said at least one data word in said buffer under control of a data word present indication provided by said source;

C. retrieving said at least one data word from said buffer for provision to said destination under control of a synchronized data word present indication; and D. generating the synchronized data word present indication in response to the first clock signal, said second clock signal, and said data word present indication, the synchronized data word present indication conforming to the data word present indication synchronized from the first clock signal domain into the second clock signal domain.

16. An information transfer method as defined in claim 15 further comprising the step of transferring said at least one data word to a downstream utilization element operating in said second clock domain.

17. An information transfer method as defined in claim 15 in which:

A. said information comprises a packet comprising a plurality of data words transferred in series in synchrony with said first clock signal, the data word present indication indicating a first in said packet;

B. said buffer comprises a FIFO buffer comprising a series of storage locations each for buffering a data word;

C. said buffer storage step comprises the steps of i. providing a write pointer configured to identify one of said storage locations in which a data word is to be written;

ii. enabling, in response to said first clock signal, a said data word from said packet to be stored in one of said storage locations in said FIFO buffer identified by said write pointer; and ii. advancing said write pointer in synchrony with said first clock signal to identify successive ones of said storage locations as successive data words from said packet are buffered in ones of said storage locations.

18. An information transfer method as defined in claim 17 in which said buffer retrieval step includes the step of providing a synchronized write pointer configured to control the retrieval of data words from said FIFO buffer, and advancing the synchronized write pointer in synchrony with the first clock signal in response to the synchronized data word present indication.

19. An information transfer method as defined in claim 17 in which said FIFO comprises a predetermined number of storage locations each identified by an address from a low order address to a high order address, write pointer being advanced to identify successive ones of said storage locations and, after the write pointer points to the high order address, reset to point to the low order address.

20. An information transfer method as defined in claim 15 in which:

A. said information comprises a packet comprising a plurality of data words transferred in series in synchrony with said first clock signal, the data word present indication indicating a first in said packet;

B. said buffer comprises a FIFO buffer comprising a series of storage locations each for buffering a data word;

C. said buffer retrieval step comprises the steps of:

i. providing a read pointer configured to identify one of said storage locations from which a data word is to be retrieved;

ii. providing a synchronized write pointer configured to provide an identification of one of said storage locations into which a data word is to be written, synchronized into said second clock domain;

ii. enabling a said data word from said packet to be retrieved from one of said storage locations in said FIFO buffer identified by said read pointer, said read pointer being advanced as each data word is retrieved; and ii. advancing said write pointer in response to said synchronized data word present indication in synchrony with said second clock signal to identify successive ones of said storage locations as successive data words from said packet are buffered in ones of said storage locations.

21. An information transfer method as defined in claim 20 in which said FIFO comprises a predetermined number of storage locations each identified by an address from a low order address to a high order address, the read pointer being advanced to identify successive ones of said storage locations and, after the read pointer points to the high order address, reset to point to the low order address.

22. An information transfer method as defined in claim 20 in which said FIFO comprises a predetermined number of storage locations each identified by an address from a low order address to a high order address, the synchronized write pointer being advanced to identify successive ones of said storage locations and, after the synchronized write pointer points to the high order address, reset to point to the low order address.

23. An information transfer method as defined in claim 20 in which, during said data word retrieval step, said read pointer is advanced so as to maintain a predetermined minimum difference between said the storage location identified by said read pointer and the storage location identified by said synchronized write pointer.

24. An information transfer method as defined in claim 15 in which each of said data word present indication and said synchronized data word present indication has a plurality of conditions, and each of said first and second clock signals defines a series of timing indications, the synchronized data word present indication generating step comprising the steps of:

A. identifying, in response to said first and second clock signals, one of said second clock signal timing indications as a sample timing indication; and B. sampling said data word present indication in synchrony with the identified one of said second clock signal timing indication and condition the synchronized data word present indication in accordance with the condition of said data word present indication.

25. An information transfer method as defined in claim 24 in which the each of the first and second clock signals comprise a series of pulses comprising a series of alternating leading and trailing edges defining the clock signals' respective timing indications, the sample timing indication generating step comprising the steps of:

A. dividing the first clock signal by a predetermined value, thereby to generate a divided first clock signal, the divided first clock signal also comprising a series of pulses comprising a series of alternating leading and trailing edges; and B. a timing indication selection step of generating said sample timing indication a predetermined number of pulses of said second clock signal following a predetermined one of the leading or trailing edge of the first clock signal.

26. An information transfer method as defined in claim 25 in which successive pulses of the second clock signal are assigned a series of respective phase identifiers, the number of successive phase identifiers corresponding to the predetermined value, the timing indication selection step selecting a phase identifier for a second clock signal as the sample timing indication.

27. An information transfer method as defined in claim 26 in which
   A. said information comprises a packet comprising a plurality of data words transferred in series in synchrony with said first clock signal, the data word present indication indicating a first in said packet;
   B. said buffer comprises a FIFO buffer comprising a series of storage locations each for buffering a data word;
   C. said timing indication selection step including the step of generating a phase shift indication if the phase identifier for the phase identifier selected thereby changes;
   D. said buffer retrieval step comprising the step of:
      i. providing a read pointer configured to identify one of said storage locations from which a data word is to be retrieved;
      ii. providing a synchronized write pointer configured to provide an identification of one of said storage locations into which a data word is to be written, synchronized into said second clock domain;
      ii. in responsive to said second clock signal and said synchronized write pointer, enabling a said data word from said packet to be retrieved from one of said storage locations in said FIFO buffer identified by said read pointer, and advancing said read pointer as each data word is retrieved; and
      ii. in response to said synchronized data word present indication, said phase shift identification and said second clock signal, advancing said write pointer to identify successive ones of said storage locations as the buffer storage element buffers successive data words from said packet in ones of said storage locations.

28. An information transfer method as defined in claim 15, each data word comprising a plurality of slices, the information transfer method comprising a plurality of slice transfer steps, each for transferring a slice, each slice transfer step comprising the buffer providing step, the buffer storage step, the buffer retrieval step, and the synchronization step, said information transfer method further comprising the step of concurrently transferring all of the slices comprising said at least one data word to a downstream utilization element operating in said second clock domain.

29. An information transfer computer program product for controlling a computer transferring information, in the form of at least one digital data word, from a source operating in a first clock signal domain defined by a first clock signal, to a destination operating in a second clock signal domain defined by a second clock signal, said information transfer system comprising a computer readable medium having encoded thereon:
   A. a buffer module configured to enable said computer to establish a buffer;
   B. a buffer storage module configured to enable said computer to store said at least one data word in said buffer under control of a data word present indication provided by said source;
   C. a buffer retrieval module configured to enable said computer to retrieve said at least one data word from said buffer for provision to said destination under control of a synchronized data word present indication; and
   D. a synchronizer module configured to enable said computer to generate the synchronized data word present indication in response to the first clock signal, said second clock signal, and said data word present indication, the synchronized data word present indication conforming to the data word present indication synchronized from the first clock signal domain into the second clock signal domain.

30. An information transfer computer program product as defined in claim 29 in which said buffer retrieval module is further configured to enable said computer to transfer said at least one data word to a downstream utilization element operating in said second clock domain.

31. An information transfer computer program product as defined in claim 29 in which:
   A. said information comprises a packet comprising a plurality of data words transferred in series in synchrony with said first clock signal, the data word present indication indicating a first in said packet;
   B. said buffer module is further configured to enable said computer to generate a FIFO buffer comprising a series of storage locations each for buffering a data word;
   C. said buffer storage module comprises
      i. a write pointer module configured to enable said computer to identify one of said storage locations in which a data word is to be written;
      ii. a data word storage element module responsive to said first clock signal configured to enable said computer to enable a said data word from said packet to be stored in one of said storage locations in said FIFO buffer identified by said write pointer; and
      ii. a write pointer control module responsive to said data word present indication configured to enable said computer to advance said write pointer in synchrony with said first clock signal to identify successive ones of said storage locations as successive data words from said packet are buffered in ones of said storage locations.

32. An information transfer computer program product as defined in claim 31 in which said buffer retrieval module includes a synchronized write pointer module configured to enable said computer to control the retrieval of data words from said FIFO buffer, the synchronized write pointer being advanced by said computer, in response to processing by a synchronized write pointer control module, in synchrony with the first clock signal in response to the synchronized data word present indication.

33. An information transfer computer program product as defined in claim 31 in which said FIFO comprises a predetermined number of storage locations each identified by an address from a low order address to a high order address, the write pointer control module configured to enable said computer to enable the write pointer to identify successive ones of said storage locations and to, after the write pointer points to the high order address, reset the write pointer to point to the low order address.

34. An information transfer computer program product as defined in claim 29 in which:
   A. said information comprises a packet comprising a plurality of data words transferred in series in synchrony with said first clock signal, the data word present indication indicating a first in said packet;

B. said buffer module enables said computer to provide a FIFO buffer comprising a series of storage locations each for buffering a data word;

C. said buffer retrieval module comprises:
  i. a read pointer module configured to enable said computer to identify one of said storage locations from which a data word is to be retrieved;
  ii. a synchronized write pointer module configured to enable said computer to provide an identification of one of said storage locations into which a data word is to be written, synchronized into said second clock domain;
  ii. a data word retrieval module, responsive to said second clock signal and said synchronized write pointer, configured to enable said computer to enable a said data word from said packet to be retrieved from one of said storage locations in said FIFO buffer identified by said read pointer, the data word retrieval module enabling said computer to advance said read pointer as each data word is retrieved; and
  ii. a synchronized write pointer control module responsive to said synchronized data word present indication configured to enable said computer to advance said write pointer in synchrony with said second clock signal to identify successive ones of said storage locations as the buffer storage element buffers successive data words from said packet in ones of said storage locations.

35. An information transfer computer program product as defined in claim 34 in which said FIFO comprises a predetermined number of storage locations each identified by an address from a low order address to a high order address, the data word retrieval module being configured to enable said computer to enable the read pointer to identify successive ones of said storage locations and to, after the read pointer points to the high order address, reset the read pointer to point to the low order address.

36. An information transfer computer program product as defined in claim 34 in which said FIFO comprises a predetermined number of storage locations each identified by an address from a low order address to a high order address, the synchronized write pointer control module configured to enable said computer to enable the synchronized write pointer to identify successive ones of said storage locations and to, after the synchronized write pointer points to the high order address, reset the synchronized write pointer to point to the low order address.

37. An information transfer computer program product as defined in claim 34 in which said data word retrieval module is configured to enable said computer to advance said read pointer so as to maintain a predetermined minimum difference between said the storage location identified by said read pointer and the storage location identified by said synchronized write pointer.

38. An information transfer computer program product as defined in claim 29 in which each of said data word present indication and said synchronized data word present indication has a plurality of conditions, and each of said first and second clock signals defines a series of timing indications, the synchronizer module comprising:
  A. a sample timing indication signal generator module configured to enable said computer to identify one of said second clock signal timing indications as a sample timing indication responsive to said first and second clock signals; and
  B. a sampler module configured to enable said computer to sample said data word present indication in synchrony with the identified one of said second clock signal timing indication and condition the synchronized data word present indication in accordance with the condition of said data word present indication.

39. An information transfer computer program product as defined in claim 38 in which the each of the first and second clock signals comprise a series of pulses comprising a series of alternating leading and trailing edges defining the clock signals' respective timing indications, the sample timing indication signal generator module comprising:
  A. a clock divider module configured to enable said computer to divide the first clock signal by a predetermined value, thereby to generate a divided first clock signal, the divided first clock signal also comprising a series of pulses comprising a series of alternating leading and trailing edges; and
  B. a timing indication selector module configured to enable said computer to generate said sample timing indication a predetermined number of pulses of said second clock signal following a predetermined one of the leading or trailing edge of the first clock signal.

40. An information transfer computer program product as defined in claim 39 in which successive pulses of the second clock signal are assigned a series of respective phase identifiers, the number of successive phase identifiers corresponding to the predetermined value, the timing indication selector module enabling said computer to select a phase identifier for a second clock signal as the sample timing indication.

41. An information transfer computer program product as defined in claim 40 in which
  A. said information comprises a packet comprising a plurality of data words transferred in series in synchrony with said first clock signal, the data word present indication indicating a first in said packet;
  B. said buffer comprises a FIFO buffer comprising a series of storage locations each for buffering a data word;
  C. said timing indication selector module configured to enable said computer to generate a phase shift indication if the phase identifier for the phase identifier selected thereby changes;
  D. said buffer retrieval module comprises:
    i. a read pointer module configured to enable said computer to identify one of said storage locations from which a data word is to be retrieved;
    ii. a synchronized write pointer module configured to enable said computer to provide an identification of one of said storage locations into which a data word is to be written, synchronized into said second clock domain;
    ii. a data word retrieval module configured to enable said computer to, responsive to said second clock signal and said synchronized write pointer enable a said data word from said packet to be retrieved from one of said storage locations in said FIFO buffer identified by said read pointer, and advance said read pointer as each data word is retrieved; and
    ii. a synchronized write pointer control module configured to enable said computer to, responsive to said synchronized data word present indication, said phase shift identification and said second clock signal, advance said write pointer to identify successive ones of said storage locations as the buffer storage element buffers successive data words from said packet in ones of said storage locations.

42. An information transfer computer program product as defined in claim 29, each data word comprising a plurality of slices, the information transfer computer program product including a plurality of slice transfer control module each for controlling the computer to use the buffer module, said buffer storage module, said buffer retrieval module, and a said synchronizer module, to transfer all of the slices comprising said at least one data word to a downstream utilization element operating in said second clock domain.

43. An information transfer system for transferring information, in the form of at least one digital data word, from a source operating in a first clock signal domain defined by a first clock signal, to a destination operating in a second clock signal domain defined by a second clock signal, said information transfer system comprising A. a computer, and B. a control subsystem configured to control the computer, the control subsystem comprising:
  i. a buffer module configured to enable said computer to establish a buffer;
  ii. a buffer storage module configured to enable said computer to store said at least one data word in said buffer under control of a data word present indication provided by said source;
  iii. a buffer retrieval module configured to enable said computer to retrieve said at least one data word from said buffer for provision to said destination under control of a synchronized data word present indication; and
  iv. a synchronizer module configured to enable said computer to generate the synchronized data word present indication in response to the first clock signal, said second clock signal, and said data word present indication, the synchronized data word present indication conforming to the data word present indication synchronized from the first clock signal domain into the second clock signal domain.

44. A control system for controlling a computer to form an information transfer system for transferring information, in the form of at least one digital data word, from a source operating in a first clock signal domain defined by a first clock signal, to a destination operating in a second clock signal domain defined by a second clock signal, the control subsystem comprising:

A. a buffer module configured to enable said computer to establish a buffer;

B. a buffer storage module configured to enable said computer to store said at least one data word in said buffer under control of a data word present indication provided by said source;

C. a buffer retrieval module configured to enable said computer to retrieve said at least one data word from said buffer for provision to said destination under control of a synchronized data word present indication; and D. a synchronizer module configured to enable said computer to generate the synchronized data word present indication in response to the first clock signal, said second clock signal, and said data word present indication, the synchronized data word present indication conforming to the data word present indication synchronized from the first clock signal domain into the second clock signal domain.

45. A system for distributing code stored on a computer readable medium and executable by a computer, the code including a plurality of modules each configured to control the computer, the code comprising:

A. a buffer module configured to enable said computer to establish a buffer;

B. a buffer storage module configured to enable said computer to store said at least one data word in said buffer under control of a data word present indication provided by said source;

C. a buffer retrieval module configured to enable said computer to retrieve said at least one data word from said buffer for provision to said destination under control of a synchronized data word present indication; and D. a synchronizer module configured to enable said computer to generate the synchronized data word present indication in response to the first clock signal, said second clock signal, and said data word present indication, the synchronized data word present indication conforming to the data word present indication synchronized from the first clock signal domain into the second clock signal domain.

* * * * *